Dec. 6, 1932.  A. GROT  1,890,054
PHOTOGRAPHIC STAGE SETTING
Filed July 18, 1931   2 Sheets-Sheet 1

INVENTOR.
ANTON GROT,
BY Alfred W. Knight and
Alfred W. Knight
ATTORNEYS.

Patented Dec. 6, 1932

1,890,054

UNITED STATES PATENT OFFICE

ANTON GROT, OF BRENTWOOD HEIGHTS, CALIFORNIA

PHOTOGRAPHIC STAGE SETTING

Application filed July 18, 1931. Serial No. 551,680.

This invention relates to improvements in stage settings for photographic purposes and particularly to means for producing the illusion of depth to a motion picture stage setting, by means of exaggerated perspective.

The principal object of the invention is to provide for the production of an illusion of depth or distance in a walled stage setting without producing an apparent distortion of the photographic subjects on said set.

A further object of the invention is to provide means for obtaining an illusion of rapid gain in vertical dimensions of an object during forward movement of said object on the photographic stage setting.

A further object of the invention is to provide a stage setting in which the upper edges of rearwardly extending vertical walls within said setting are provided with vanishing points established on an artificial horizon disposed a finite distance rearwardly of said setting with respect to a photographic camera, and in which the upper edges of transversely extending vertical walls within said setting are provided with vanishing points disposed a finite distance from said setting laterally thereof with respect to the camera.

A further object of the invention is to provide a stage setting for photographic purposes in which a portion of the floor surface thereof is provided with a forward and upward inclination substantially along a line of vision of a camera disposed so as to photograph said set, whereby the lower extremities of any object in forward motion on said inclined surface will be imaged on substantially the same level on the photographic register during such forward movement thereof, obtaining an effect of exaggerated dimensional growth of said object during such movement.

It has been common practice in motion picture photography to attempt to convey an illusion of depth to a particular stage setting by placing the camera at a low level, sometimes practically on the level of the floor of said setting, so that the rearward portions of the wall surfaces subtend a somewhat smaller vertical angle in proportion to that angle subtended by the forward portions of such walls than would be the case when the camera is disposed substantially at eye-level. There is obtained by the above means a partial illusion of depth to the stage setting, but in general, this effect is accompanied by other effects which seriously detract from the desired depth illusion effect. Among these other effects is that of an upwardly and rearwardly slanting rear wall of the staging and that of an increase in the lateral dimensions of the base of an object or objects which are disposed relatively near the camera due to the fact that the lower part of an object will necessarily subtend a greater horizontal angle than the upper parts of such object, and thus appear larger on the photographic register.

There have also been attempts made to obtain the illusion of a rapid increase in size of a forwardly moving object on a motion picture setting, by placing the camera as above. In this case, as the object moves or is moved forwardly toward the camera the lower limit of the object remains substantially at the same level on the photographic register and thus the growth or apparent increase in size of the object will take place principally vertically from said lower limit. This method of obtaining the above effect is open to the same criticisms given above in connection with the depth illusion effect inasmuch as there is excessive distortion of the image of the object and the setting as a whole and the above methods are limited to use where these distorted effects are desirable, in which case the illusion of rapid growth of the object is mainly lost or masked by the distortion effects.

According to the present invention, the desired effect of increased depth in a stage setting and the effect of an abnormal gain in dimensions of a forwardly moving object may be obtained without introducing effects which present distortions of the subject in other ways. To produce the first named effect, the rearmost portions of the wall surfaces are caused to subtend an abnormally smaller vertical angle than the foremost portions thereof by the simple expedient of disposing the rearward portions of the upper edges of said wall surfaces at a lower level than forward portions of said upper edges, and sloping the upper edge of said wall surfaces downwardly from the forward portions to the rearward portions thereof. With the use of a construction of this type, the photographic camera may be disposed substantially at the normal eye-level and still register the desired effect.

The second object of the invention, namely that of providing an effect of an exaggerated growth in the size of a forwardly moving object, is obtained by providing that portion of the floor surface over which the movement is to take place with an upwardly and forwardly inclined surface, said inclination being preferably such that said surface lies substantially along a line of vision of the camera. In this manner, the lower extremities of an object will be imaged on the photographic register at substantially the same level, irrespective of the position of such object on said inclined surface, and, upon movement of the object from a rearward position to a forward position, the normal apparent growth of the object is exaggerated by virtue of the fact that such growth takes place mainly upwardly from the lower extremities thereof.

The accompanying drawings illustrate an embodiment of a structure of the present invention and referring thereto:

Figure 1:
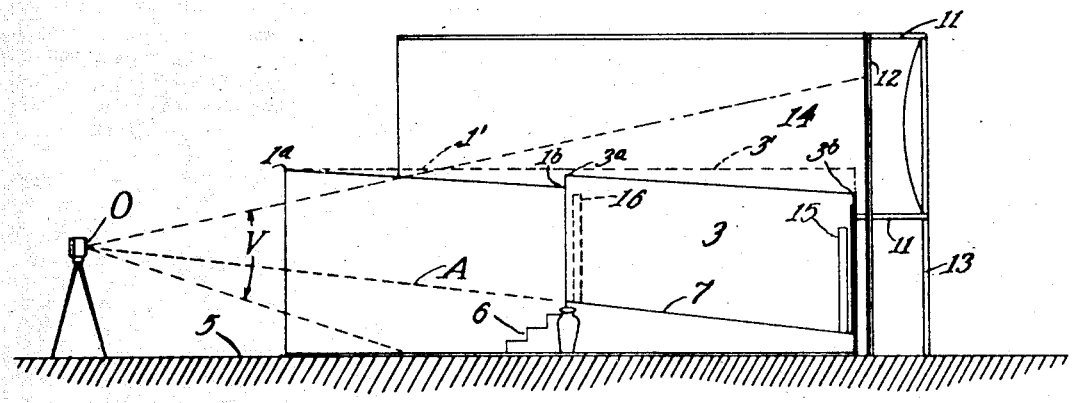
Fig. 1 is a side elevation of a stage setting having a structure according to the present invention.
Figure 2:
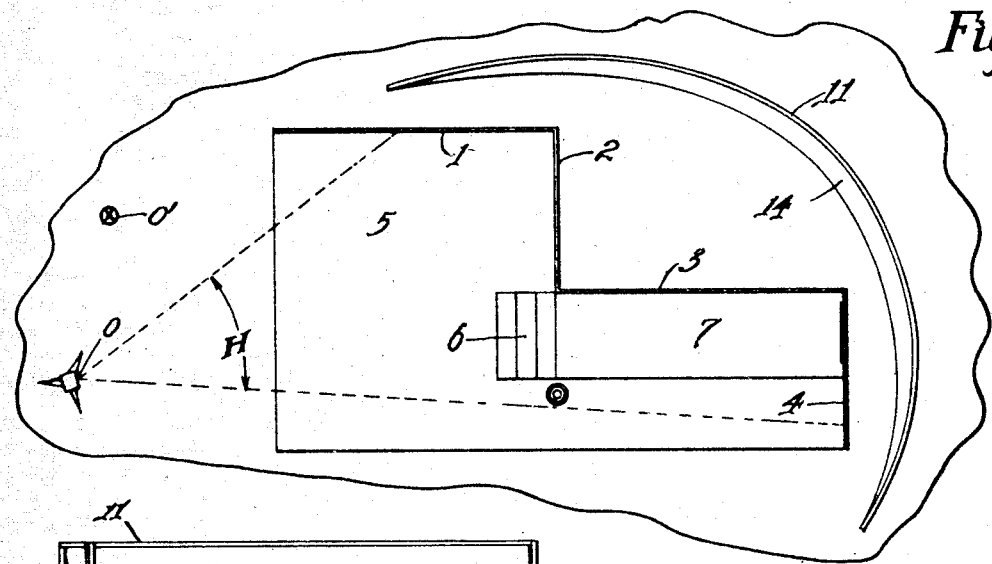
Fig. 2 is a plan view thereof.
Figure 3:
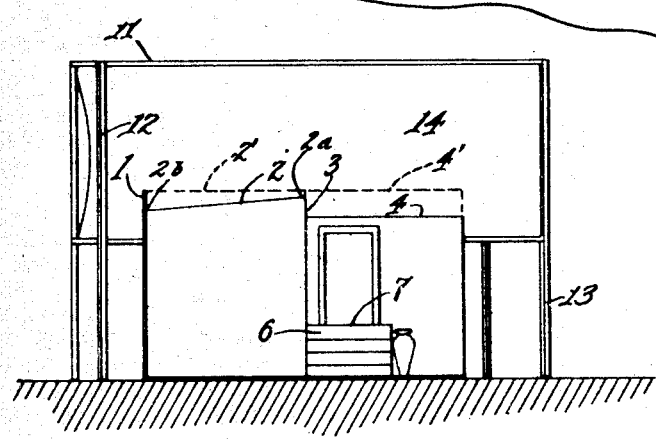
Fig. 3 is an end elevation thereof taken from the camera or forward side.

Referring to Figs. 1 to 3, the structure may comprise a plurality of walls 1, 2, 3, and 4, a floor 5, steps 6 and a ramp 7, together with a photographic camera 8, disposed at some such point as 0. The upper edges of the walls 1, 2 and 3 are sloped downwardly from their forward points 1a, 2a, and 3a respectively, to their respective rearward points 1b, 2b and 3b. Wall 4, being disposed substantially perpendicular to incident lines of vision of the camera 8, is not provided with a sloping upper edge as said wall would not be in perspective when in such position. Were the camera to be placed at some point such as 0′ the upper edge of wall 2 would be left without slope and the upper edge of wall 4 would be provided with an outward and downward slope.

The effect of the downward and rearward sloping of the upper edges of the wall surfaces is that of producing an artificial vanishing point for such lines. The vanishing point for the normal upper edges of such wall surfaces, as indicated by dotted lines at 1′, 2′ and 3′ would be at a horizon located an infinite distance rearwardly therefrom, but with the use of sloping upper edges according to this invention, the vanishing point is drawn forwardly so as to be at some point a finite distance rearwardly of the structure.

The rearward and downward sloping ramp 7 is provided with an inclination such that said ramp lies substantially along a line of vision of the camera, for example, along dotted line A, so that all points on said ramp will appear substantially on the same level on the photographic register. The above inclined portion of the floor surface is shown as a ramp inclined from an elevated portion of the structure merely as an illustration and it will be understood that it is entirely within the scope of this invention to provide a sloping or ramp portion of the floor surface extending downwardly and rearwardly from the main floor level if desired.

A suitable ceiling drop is preferably employed rearwardly of the wall structure and a portion thereof is included in the vertical camera angle, such as represented by the dotted lines V, Fig. 1. Such a ceiling drop may comprise a flat vertical surface curved generally around the rearward portions of the structure so as to extend outside the vertical camera angle V and the horizontal camera angle H (Fig. 2), but in general I prefer to use the type of ceiling drop described in my pending application, Serial No. 547,559, filed June 29, 1931. A drop of this type may comprise a curved transverse framework 11 provided with vertical end members 12 and vertical support members 13, there being stretched over said transverse framework a drop of some flexible material such as a fabric or the like, as shown at 14. The drop 14 is constructed by being uniformly stretched over and secured to the upper and lower framework members 11 and then stretched laterally along the lateral edges and secured along such edges to the vertical framework 12, obtaining a horizontally concave and substantially vertically convex surface by reason of the shape assumed by said material when stretched laterally over the framework.

Figure 4:
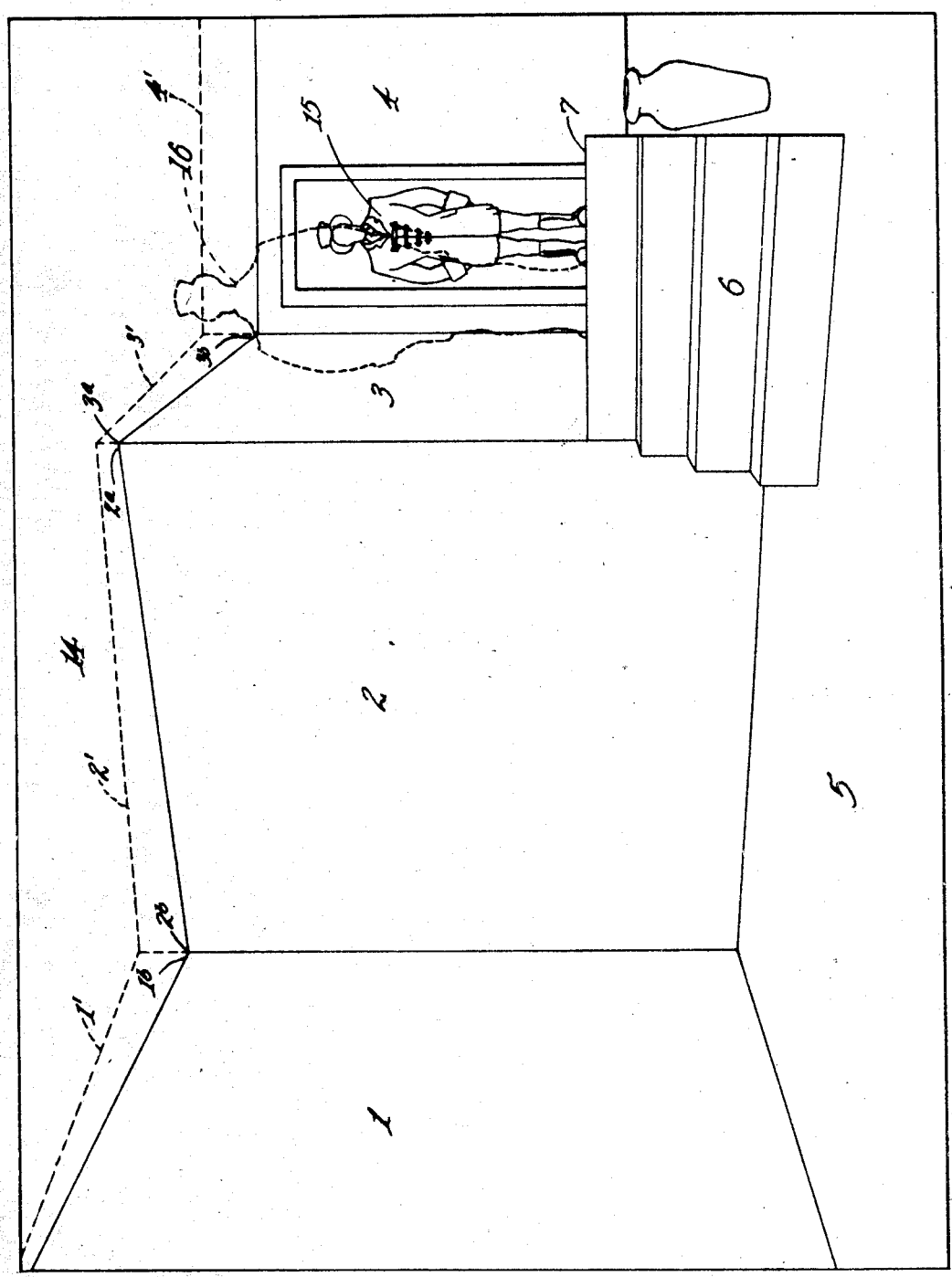
Fig. 4 is a perspective view of the stage setting showing the appearance thereof on the photographic register of a motion picture camera, on somewhat enlarged scale.

Fig. 4 illustrates the appearance of the stage setting shown in Figs. 1 to 3 in perspective as viewed by a photographic camera. In this figure there is shown in solid lines at 15 the appearance of an object positioned adjacent the rearward portion of the ramp 7, which may be compared with the appearance of the same object positioned adjacent the forward portion of the ramp, as shown in dotted lines at 16.

In Fig. 1, the forward and rearward positions of the movable object are shown, for the sake of simplicity, as dotted and solid rectangle 16 and 15 respectively.

In the above figure, dotted lines 1′, 2′, 3′ and 4′ indicate the position of the upper edges of normal walls, corresponding to dotted lines of the same number in Figs. 1 to 3. It will be readily apparent to one skilled in the art that by the use of the sloping upper wall edges of my invention, a strong impression or illusion of greater depth is given to the structure, which illusion is of great value in motion picture photography.

Claims:

1. A stage setting for photographic purposes comprising a plurality of vertical wall surfaces and a floor surface, said wall surfaces having the rearward portions of the upper edges thereof disposed at a lower level than the forward portions of said upper edges.

2. A stage setting for photographic purposes comprising a plurality of vertical wall surfaces and a floor surface, said wall surfaces having the rearward portions of the upper edges thereof disposed at a lower level than the forward portions of said upper edges, said upper edges of said wall surfaces being sloped downwardly from said forward portions to said rearward portions.

3. A stage setting for photographic purposes, as set forth in claim 2, in combination with a ceiling drop disposed rearwardly of said wall surfaces and extending from somewhat below the upper limits of said wall surfaces into the field of view.

4. A stage setting for photographic purposes comprising a plurality of vertical wall surfaces and a floor surface, a portion of said floor surface being inclined rearwardly and downwardly.

5. A stage setting for use in combination with a photographic camera, comprising, a plurality of vertical wall surfaces and a floor surface, a portion of said floor surface being inclined downwardly and rearwardly substantially along a line of vision of said camera.

6. A stage setting for use in combination with a photographic camera, comprising a plurality of vertical wall surfaces and a floor surface, said wall surfaces having the rearward portions of the upper edges thereof disposed at a lower level than the forward portions of said upper edges, said upper edges of said wall surfaces being sloped from said forward portions to said rearward portions, and a portion of said floor surface being inclined rearwardly and downwardly substantially along a line of vision of said camera.

In testimony whereof I have hereunto subscribed my name this 13th day of July, 1931.

ANTON GROT.